US011997396B2

(12) United States Patent
Kusumi et al.

(10) Patent No.: US 11,997,396 B2
(45) Date of Patent: May 28, 2024

(54) PROCESSING APPARATUS, PROCESSING SYSTEM, IMAGE PICKUP APPARATUS, PROCESSING METHOD, AND MEMORY MEDIUM

(71) Applicant: CANON KABUSHIKI KAISHA, Tokyo (JP)

(72) Inventors: Yuichi Kusumi, Tochigi (JP); Yoshiaki Ida, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 428 days.

(21) Appl. No.: 17/338,178

(22) Filed: Jun. 3, 2021

(65) Prior Publication Data

US 2021/0385390 A1   Dec. 9, 2021

(30) Foreign Application Priority Data

Jun. 9, 2020   (JP) .................................. 2020-100331

(51) Int. Cl.
*H04N 23/76*    (2023.01)
*G06T 7/586*    (2017.01)
*H04N 23/56*    (2023.01)
*H04N 23/71*    (2023.01)

(52) U.S. Cl.
CPC ............. *H04N 23/76* (2023.01); *G06T 7/586* (2017.01); *H04N 23/56* (2023.01); *H04N 23/71* (2023.01); *G06T 2207/10152* (2013.01); *G06T 2207/20224* (2013.01)

(58) Field of Classification Search
None
See application file for complete search history.

(56) References Cited

U.S. PATENT DOCUMENTS

2011/0317043 A1\*  12/2011  On .......................... H04N 5/213
                                                        348/241
2018/0205941 A1\*  7/2018  Kopf .................... H04N 13/261

FOREIGN PATENT DOCUMENTS

JP    2010-122158 A    6/2010

OTHER PUBLICATIONS

Guo, Jie, and Jingui Pan. "Real-time rendering with complex natural illumination." 2011 IEEE International Conference on Multimedia and Expo. IEEE, 2011. (Year: 2011).\*

(Continued)

*Primary Examiner* — Michelle M Entezari Hausmann
(74) *Attorney, Agent, or Firm* — CANON U.S.A., INC. IP Division

(57) ABSTRACT

An apparatus includes at least one processor configured to execute a plurality of tasks including a first normal acquiring task configured to acquire first normal information of an object, a designated area acquiring task configured to acquire a designated portion in the object, the designated area being designated by a user, a second normal acquiring task configured to acquire second normal information of the object, the second normal information being normal information having a lower frequency than a frequency of the first normal information, a virtual light source determining task configured to determine a virtual light source condition based on the second normal information corresponding to the designated portion, and a rendering task configured to generate a rendering image using the first normal information and the virtual light source condition.

19 Claims, 9 Drawing Sheets

114

114a

115

116

116a

117

(56) References Cited

OTHER PUBLICATIONS

Okabe, Makoto, et al. "Illumination brush: Interactive design of all-frequency lighting." 15th Pacific Conference on Computer Graphics and Applications (PG'07). IEEE, 2007. (Year: 2007).*
Sun T, Xu Z, Zhang X, Fanello S, Rhemann C, Debevec P, Tsai YT, Barron JT, Ramamoorthi R. Light stage super-resolution: continuous high-frequency relighting. ACM Transactions on Graphics (TOG). Nov. 26, 2020;39(6):1-2. (Year: 2020).*
Bouganis, C-S., and Mike Brookes. "Multiple light source detection." IEEE transactions on pattern analysis and machine intelligence 26.4 (2004): 509-514. (Year: 2004).*
Ritschel T, Grosch T, Kim MH, Seidel HP, Dachsbacher C, Kautz J. Imperfect shadow maps for efficient computation of indirect illumination. ACM transactions on graphics (tog). Dec. 1, 2008;27(5):1-8. (Year: 2008).*

\* cited by examiner

PROCESSING APPARATUS, PROCESSING SYSTEM, IMAGE PICKUP APPARATUS, PROCESSING METHOD, AND MEMORY MEDIUM

BACKGROUND OF THE DISCLOSURE

Field of the Disclosure

The present disclosure relates to a processing apparatus that generates a rendering image.

Description of the Related Art

When more pieces of physical information are acquired for an object, an image can be generated based on a physical model in image processing after image pickup. For example, it is possible to generate an image (rendering image) in which an appearance of the object is changed, such that irradiation of light to the object, i.e., lighting, is changed. The appearance of the object is determined by object shape information, object reflectance information, light source information, and the like. When light is emitted from a light source and reflected by the object, a physical behavior of the reflected light depends on a local normal, and thus it is effective to use the object's normal as the shape information of the object. Japanese Patent Laid-Open No. ("JP") 2010-122158 describes a photometric stereo as a method for acquiring a normal of an object with high accuracy and high resolution.

When a user designates an area to be brightened or darkened in an image, a lighting-rendering image is generated based on the designated area, and therefore the user can intuitively acquire a rendering image with user-intended lighting. However, if the normal of the object acquired by the photometric stereo as described in JP 2010-122158 is used, the lighting significantly changes even when the area designated by the user is slightly shifted, and the user may not be able to intuitively change the lighting.

SUMMARY OF THE DISCLOSURE

An apparatus according to one aspect of the embodiments includes at least one processor configured to execute a plurality of tasks including a first normal acquiring task configured to acquire first normal information of an object, a designated area acquiring task configured to acquire a designated portion in the object, the designated area being designated by a user, a second normal acquiring task configured to acquire second normal information of the object, the second normal information being normal information having a lower frequency than a frequency of the first normal information, a virtual light source determining task configured to determine a virtual light source condition based on the second normal information corresponding to the designated portion, and a rendering task configured to generate a rendering image using the first normal information and the virtual light source condition.

Each of a processing system and a pickup apparatus each including the processing apparatus, a processing method corresponding to the processing apparatus, and a memory medium storing a computer program that causes a computer to execute the processing method also constitutes another aspect of the present disclosure.

Further features of the disclosure will become apparent from the following description of exemplary embodiments with reference to the attached drawings.

DESCRIPTION OF THE EMBODIMENTS

Figure 1:
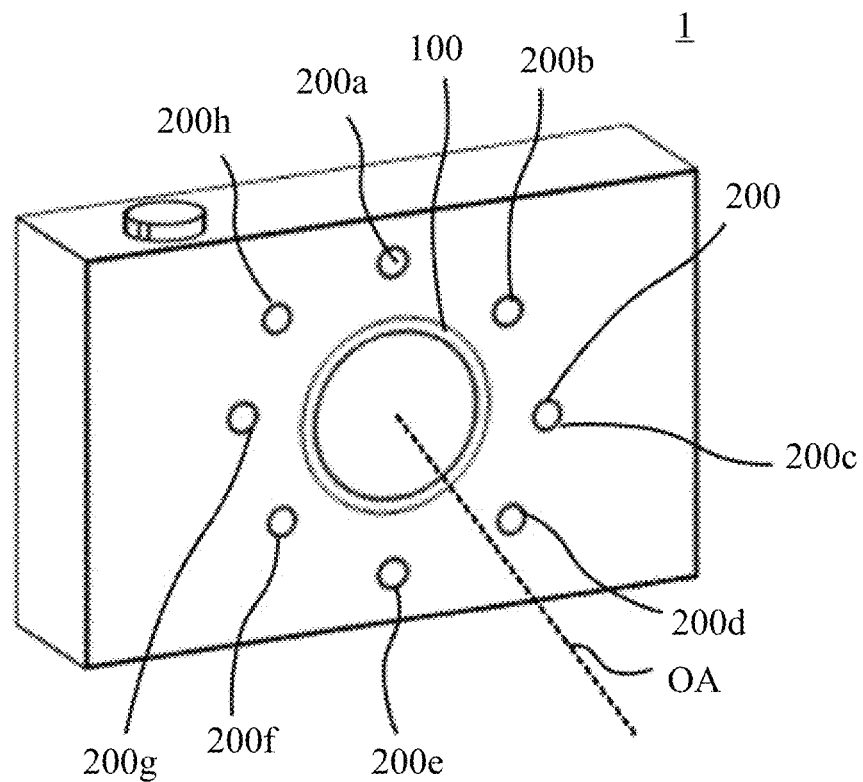
FIG. 1 is an external view illustrating an image pickup apparatus according to a first embodiment.

Referring now to the accompanying drawings, a description will be given of embodiments according to the present disclosure. Corresponding elements in respective figures will be designated by the same reference numerals, and a description thereof will be omitted.

Figure 14:
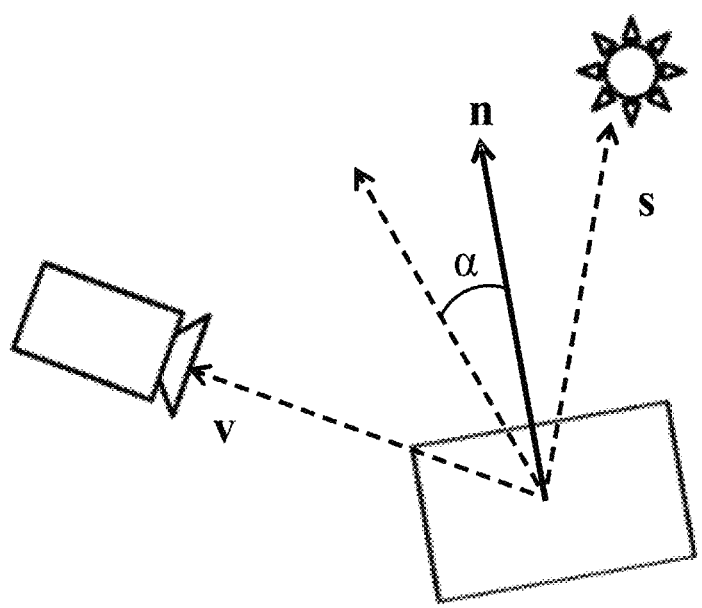
FIG. 14 is an explanatory diagram for the Torrance-Sparrow model.

A photometric stereo is a method which assumes a reflection characteristic of an object based on normals (surface normals) of the object and on a direction from the object to a light source, and calculates normals from luminance information of the object irradiated with light from a plurality of light source positions and the assumed reflection characteristic. If a reflectance is not uniquely specified from a predetermined normal and a light source position, the reflection characteristic may be approximated by the Lambertian reflectance model according to the Lamberts cosine law. FIG. 14 is an explanatory diagram for the Torrance-Sparrow model. As illustrated in FIG. 14, a specular reflection component (a mirror reflection component) depends on an angle α between a normal n and a bisector of a light source vectors and a visual line direction vector v. Thus, the reflection characteristic may be a characteristic based on a visual line direction. Further, images of the object may be captured when a light source is on and off, a difference between the images may be calculated, and an effect of the light source other than a light source such as ambient light may be eliminated from the luminance information.

Hereinafter, a description will be given of a case where the reflection characteristic is assumed by using the Lambertian reflectance model. i represents a luminance value of reflected light, $\rho_d$ represents a Lambertian diffuse reflectance of an object, E represents an intensity of incident light, s represents a unit vector (light source direction vector) indicating a direction (light source direction) from the object to a light source, and n represents a unit normal vector of the object. Here, the luminance value i is expressed by the following expression (1) according to the Lamberts cosine law.

$$i = E\rho_d s \cdot n \tag{1}$$

The expression (1) is expressed as the following expression (2), where $s_1, s_2, \ldots, s_M$ represent respective components of different M (M≥3) light source vectors, and $i_1, i_2, \ldots, i_M$ represent luminance values of respective components of the light source vectors.

$$\begin{bmatrix} i_1 \\ \vdots \\ i_M \end{bmatrix} = \begin{bmatrix} s_1^T \\ \vdots \\ s_M^T \end{bmatrix} E\rho_d n \tag{2}$$

In the expression (2), the left side represents the luminance vector of M rows and one column, $[s_1^T, \ldots, s_M^T]$ of the right side represents an incident light matrix S indicating the light source direction of M rows and three columns, and n represents the unit normal vector of three rows and one column. In the case of M=3, $E\rho_d n$ is expressed by the following expression (3) where an inverse matrix $S^{-1}$ of the incident light matrix S is used.

$$E\rho_d n = S^{-1} \begin{bmatrix} i_1 \\ \vdots \\ i_M \end{bmatrix} \tag{3}$$

The norm of the vectors on the left side of the expression (3) is the product of the intensity E of the incident light and the Lambertian diffuse reflectance $\rho_d$, and a normalized vector is calculated as the normal vector of object. That is, since the intensity E of the incident light and the Lambertian diffuse reflectance $\rho_d$ appear in the conditional expression in the form of the product, if $E\rho_d$ is assumed to be one variable, the expression (3) can be regarded as a simulated equation that determines unknown three variables of $E\rho_d$ and the two degrees of freedom of the unit normal vector n. Each variable can be determined by acquiring the luminance information using at least three light sources. If the incident light matrix S is not a regular matrix, the inverse matrix does not exist. Therefore, each of components $s_1$ to $s_3$ of the incident light matrix S is selected so that the incident light matrix S becomes a regular matrix. That is, the component $s_3$ may be selected linearly independently for the components $s_1$ and $s_2$.

In the case of M>3, the number of acquired conditional expressions is larger than the number of unknown variables to be calculated. Thus, the unit normal vector n may be calculated in the same manner as in the case of M=3 by using three arbitrarily selected conditional expressions. When four or more conditional expressions are used, the incident light matrix S is no longer a regular matrix. Therefore, for example, an approximate solution may be calculated using a Moore-Penrose pseudoinverse matrix. The unit normal vector n may be calculated by a fitting method or an optimization method.

When the reflection characteristic of the object is assumed in a model which is different from the Lambertian reflectance model, a conditional expression may not be a linear equation for each component of the unit normal vector n. In this case, if the number of the acquired conditional expressions is larger than the number of unknown variables, a fitting method or an optimization method can be used.

In the case of M>3, since a plurality of conditional expressions of three or more and M−1 or less are acquired, it is possible to calculate a plurality of candidates for the solution of the unit normal vector n. In this case, a solution may be selected from the plurality of candidates for the solution by using yet another condition. For example, the continuity of the unit normal vector n may be used as the condition. If the unit normal n is calculated for each pixel of the image pickup apparatus, and if n(x−1, y) is known where a normal in a pixel (x, y) is n(x, y), a solution that minimizes the evaluation function represented by the following expression (4) may be selected.

$$1 - n(x,y) \cdot n(x-1,y) \tag{4}$$

If n(x+1, y) and n(x, y±1) are also known, a solution that minimizes the following expression (5) may be selected.

$$4 - n(x,y) \cdot n(x-1,y) - n(x,y) \cdot n(x+1,y) - n(x,y) \cdot n(x,y-1) - n(x,y) \cdot n(x,y+1) \tag{5}$$

If there is no known normal and if there is indefiniteness in a normal at every pixel position, a solution may be selected such that the solution minimizes the sum of the values of the expression (5) in all the pixels, that is, the value of the following expression (6).

$$\Sigma_{x,y}\{4 - n(x,y) \cdot n(x-1,y) - n(x,y) \cdot n(x+1,y) - n(x,y) \cdot n(x,y-1) - n(x,y) \cdot n(x,y+1)\} \tag{6}$$

A normal at a pixel which is not the nearest neighbor pixel may be used, and an evaluation function weighted depending on the distance from a position of a pixel of interest may be used. Further, as another condition, luminance information at an arbitrary light source position may be used. In a diffuse reflectance model represented by the Lambertian reflectance model, the closer the unit normal vector and the light source direction vector are, the higher the luminance of the reflected light. Thus, the unit normal vector can be determined by selecting a solution that is close to the light source direction vector in which the luminance value is the highest in the luminance values in the plurality of light source directions.

In a specular reflection model, the following expression (7) is established where s represents the light source vector and v represents a unit vector in a direction from the object to a camera, which is also referred to as a "camera visual line vector".

$$s + v = 2(v \cdot n)n \tag{7}$$

As represented by the expression (7), if the light source direction vector s and the camera visual line vector v are known, the unit normal vector n can be calculated. If the surface is rough, the specular reflection includes variation in emission angles. However, the variation spreads near a solution which is calculated for a smooth surface, and thus the candidate closest to the solution for the smooth surface may be selected from the plurality of candidates for the solution. Alternatively, a true solution may be determined by averaging the plurality of candidates for the solution.

When the normal n and the reflectance ρ (=$E\rho_d$) are acquired by the above-described photometric stereo, the luminance value i under an arbitrary light source can be calculated by substituting the arbitrary light source vector s in the expression (1). That is, it is possible to generate a rendering image in which an appearance under an arbitrary light source is reproduced. With the expression (1), a rendering image with the Lambert diffuse reflection is generated, but it is also possible to generate a rendering image with other diffuse reflection characteristics or, in addition, a mirror surface reflection characteristic.

First Embodiment

Figure 2A:
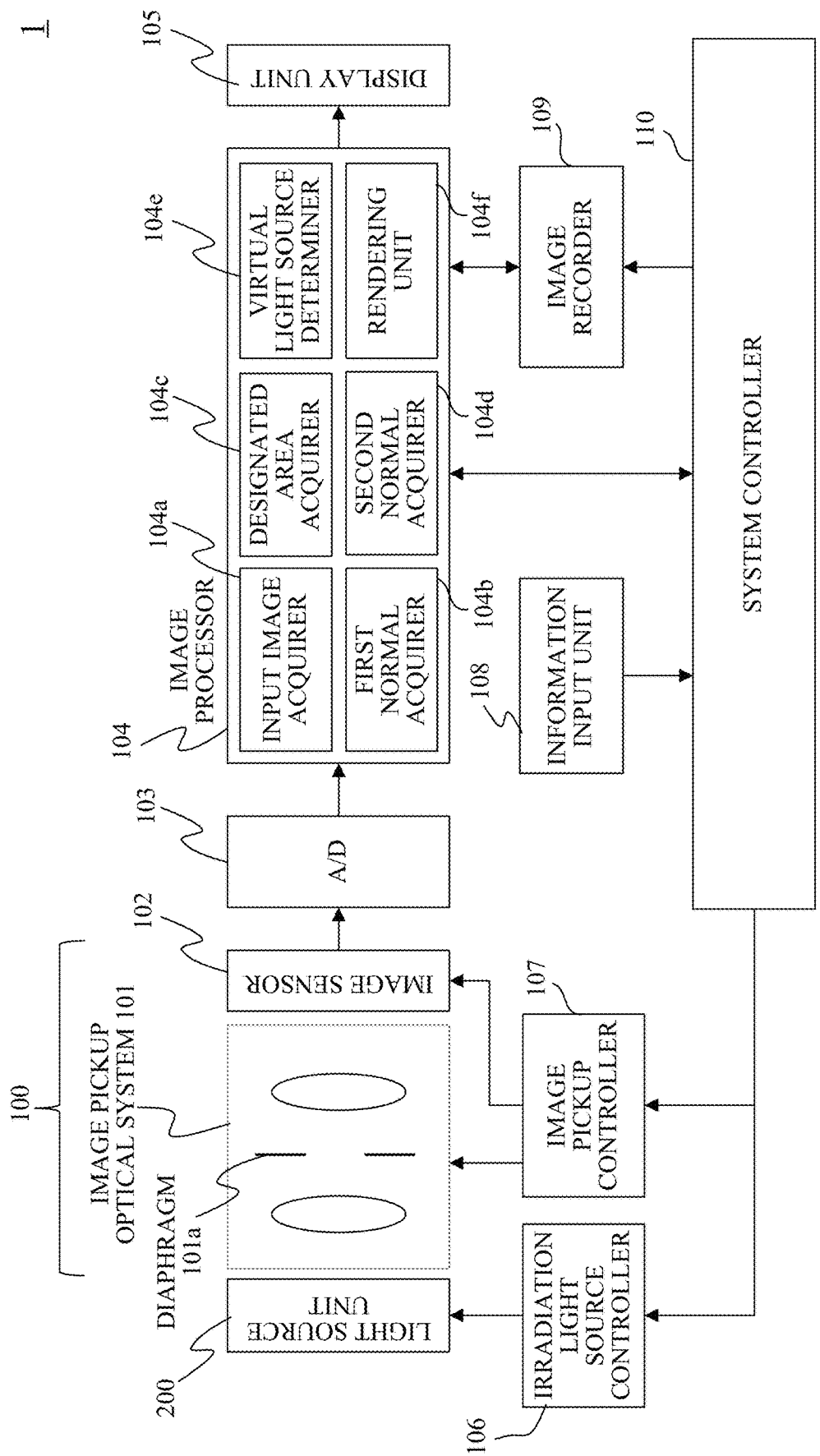
FIG. 2A is a block diagram illustrating an image pickup apparatus according to the first embodiment and a second embodiment.

Next, a description will be given of an image pickup apparatus according to the first embodiment of the present disclosure with reference to FIGS. 1 and 2A. FIG. 1 is an external view illustrating an image pickup apparatus 1 in this embodiment. FIG. 2A is a block diagram of the image pickup apparatus 1.

The image pickup apparatus 1 is configured to generate a rendering image (rewriting image) by performing rendering processing. As illustrated in FIG. 1, the image pickup apparatus 1 includes an image pickup unit 100, which is configured to capture an image of an object, and a light source unit 200. As illustrated in FIG. 2A, the image pickup unit 100 includes an image pickup optical system 101 and an image sensor 102. The light source unit 200 is configured to irradiate an object with light from different plurality of positions. In this embodiment, the light source unit 200 includes eight light sources 200a to 200h, but is not limited this. At least three light sources are used to perform photometric stereo, and therefore at least three or more light sources may be included to acquire an input image. Further, in this embodiment, eight light sources are arranged concentrically at equal distances from an optical axis OA of the image pickup optical system included in the image pickup unit 100, but the disclosure is not limited to this. Further, in this embodiment, the light source unit 200 is built in the image pickup apparatus 1, but the light source unit 200 is not limited to this. The light source unit 200 may be configured to be detachably attachable to the image pickup apparatus 1.

The image pickup optical system 101 includes a diaphragm 101a and is configured to form an image of light from the object on the image sensor 102. The image sensor 102 includes a photoelectric conversion element such as a CCD sensor or a CMOS sensor, and is configured to capture the image of the object. That is, the image sensor 102 is configured to photoelectrically convert the image (optical image) of the object formed by the image pickup optical system 101, and to generate an analog electric signal as image data corresponding to the input image. An A/D converter 103 is configured to convert the analog signal generated by the photoelectric conversion of the image sensor 102 into a digital signal, and to output the digital signal to an image processor 104.

The image processor 104 as a processing apparatus is configured to perform image processing generally performed for the digital signal, to acquire normal information of the object, and to generate a rendering image reproducing an appearance under an arbitrary virtual light source. The image processor 104 includes an input image acquirer 104a, a first normal acquirer 104b, a designated area acquirer 104c, a second normal acquirer 104d, a virtual light source determiner 104e, and a rendering unit 104f.

The output image processed by the image processor 104 is stored in an image recorder 109 such as a semiconductor memory or an optical disk. The output image may also be displayed on the display unit 105. In this embodiment, the input image acquirer 104a, the first normal acquirer 104b, the designated area acquirer 104c, the second normal acquirer 104d, the virtual light source determiner 104e, and the rendering unit 104f are built in the image pickup apparatus 1. However, this embodiment is not limited to this, and at least part of each of the above-mentioned units may be configured separately from the image pickup apparatus 1.

An information input unit 108 is configured to supply a system controller 110 with image pickup conditions, such as a diaphragm value, an exposure time, an ISO sensitivity, a focal length, etc., each of which is selected by a user. An image pickup controller 107 is configured to acquire an image under desired image pickup conditions selected by the user based on the information from the system controller 110. An irradiation light source controller 106 is configured to control a light emitting state of the light source unit 200 in response to a control instruction from the system controller 110.

The information input unit 108 is further configured to supply the system controller 110 with a designated area (or a designated portion) of the object, the designated area being designated by the user. Further, the information input unit 108 may be further configured to supply the system controller 110 with a virtual light source conditions, such as a virtual light source intensity and a virtual light source color, in addition to the designated area. Based on information from the system controller 110, the image processor 104 is configured to determine virtual light source conditions that applies a desired effect (for example, brightening or darkening) to the user-designated area, and to generate a rendering image (rewriting image).

In this embodiment, the image pickup optical system 101 is integrally configured with the image pickup apparatus 1, but the present disclosure is not limited to this. The present disclosure can also be applied to a camera system, such as a single-lens reflex camera and a mirrorless camera, which includes an image pickup apparatus main body having an image sensor and an image pickup optical system (interchangeable lens) that is detachably attachable to the image pickup apparatus main body.

Figure 3:
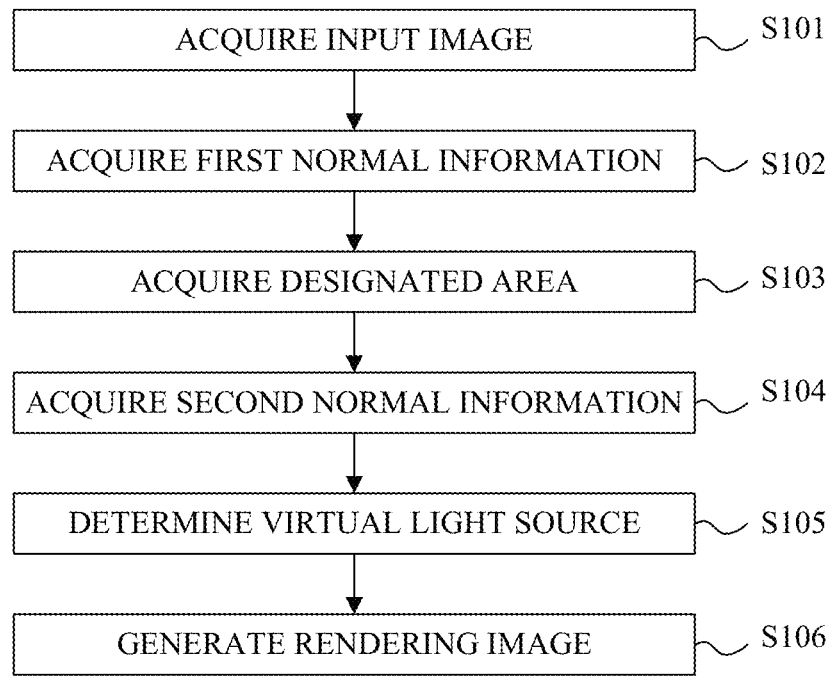
FIG. 3 is a flowchart illustrating a processing method according to the first embodiment and the second embodiment.

Next, a description will be given of rendering processing (processing method) in this embodiment with reference to FIG. 3. FIG. 3 is a flowchart illustrating the rendering processing. The rendering processing in this embodiment is executed by the system controller 110 and the image processor 104, in accordance with a processing program as a computer program. The processing program is stored in, for example, a computer-readable memory medium which is an internal memory of the system controller 110 or the like.

First, in step S101, the input image acquirer 104a acquires a plurality of input images which the image pickup unit 100 acquires by capturing images of an object while a different light source position was used for each image. The plurality of input images can be acquired by irradiating the object with light from a single light source while the position of the single light source is sequentially changed (by using a driving unit or the like). Alternatively, the plurality of input images may be acquired by irradiating the object with light sequentially emitted from the plurality of light sources (for example, the eight light sources 200a to 200h illustrated in FIG. 1) at different positions.

If, in step S102 described later, normal information is acquired with the photometric stereo assuming a diffuse reflection model such as Lambertian reflection, the input images may be a plurality of diffuse reflection images (diffusion reflected images) acquired by removing a specular reflection component from the captured image. For example, a method using a dichroism reflection model can be used so that a diffuse reflection image is acquired in which the specular reflection component is removed from the image. However, the method for removing the specular reflection component from the image is not limited to this, and various methods can be used.

The display unit 105 displays an image based on the plurality of input images, which will be also referred to as an input-image-based image hereinafter, where the displayed image is acquired by, for example, averaging one or more images or taking the maximum value, of the plurality of input images acquired by the input image acquirer 104a. Alternatively, the input image acquirer 104a may acquire and display an image which is not the above-described plurality of input images acquired by capturing the images of the object while a different light source position was used for each image. For example, an ambient light image captured while light is not emitted from a light source may be added, acquired, and displayed.

Subsequently, in step S102 of FIG. 3, the first normal acquirer 104b acquires first normal information and a reflectance of the object by using the plurality of input images acquired by capturing the images of the object while a different light source position was used for each image. The first normal information and the reflectance are calculated based on a change in luminance information depending on the light source position, by using the photometric stereo. In this embodiment, the first normal acquirer 104b calculates the first normal information and the reflectance based on the plurality of input images, but the present disclosure is not limited to this. For example, the first normal acquirer 104b may acquire normal information and a reflectance calculated by the other units, or may not acquire the input image.

In addition, the first normal acquirer 104b may acquire a normal error area which is an area having an error in the first normal information. The acquisition of the normal error area will be described below. The first normal acquirer 104b generates a temporary rendering image based on the normal information n as the first normal information, the reflectance ρ acquired in step S102, and at least one light source condition of the light source conditions with which the input images are acquired in step S101. That is, the first normal acquirer 104b generates the temporary rendering image in which the input image is reproduced by using the acquired normal information n and reflectance ρ. The temporary rendering image is acquired by rendering an image so that reproduced light source conditions become the same as the light source conditions under which the input image was captured. The first normal acquirer 104b acquires the normal error area based on the plurality of images captured with the different light source positions and the temporary rendering image in which the appearance under the same light source condition as at least one of the plurality of images is reproduced.

The temporary rendering image is generated by rendering processing using the reflection characteristic assumed when the normal information is calculated in step S102. When normal information is calculated while the Lambert diffusion is assumed, the first normal acquirer 104b can generate a plurality of temporary rendering images by using the expression (1). The temporary rendering image(s) may be either a temporary rendering image corresponding to part of the input images of the plurality of input images or a plurality of temporary rendering images corresponding to all the input images of the plurality of input images. In this embodiment, the temporary rendering image is a rendering image which is different from a rendering image finally generated in the processing of this embodiment.

Subsequently, the first normal acquirer 104b detects a distribution of the normal error area (normal error area map) based on the input image acquired in step S101 and the temporary rendering image. The normal error area is, for example, an area having larger error in normal information than the surrounding area. When a surface normal is calculated with the photometric stereo, if the object has a reflection characteristic that is different from the assumed reflection characteristic, a normal error occurs. If a rendering image is generated using the surface normal including the error, an error also occurs in the rendering image.

Therefore, the first normal acquirer 104b detects the normal error area based on a difference, i.e., a difference image, between the input image acquired in step S101 and the temporary rendering image generated in step S102. In an area having a large difference between one of the input images and a temporary rendering image in which the light source condition of the one input image is reproduced, an object is likely to have a reflection characteristic which is different from the reflection characteristic assumed by the photometric stereo, and a normal error is likely to occur.

In this embodiment, the first normal acquirer 104b detects, for example, an area where the difference between the input image and the temporary rendering image is equal to or larger than a predetermined threshold value, and sets the detected area as the normal error area. The normal error area may be determined based on a normalized difference acquired by dividing the difference by the reflectance ρ. Alternatively, the normal error area may be determined based on the normalized difference acquired by dividing the difference by the input image or by the input-image-based image which is generated based on the average value or the median value of the plurality of input images. By dividing the difference by the reflectance ρ or the input-image-based image, the effect of brightness can be reduced (or may be eliminated) from the calculated difference.

The first normal acquirer 104b may determine the normal error area based on a maximum difference which is the maximum value in the plurality of differences between the plurality of input images and the plurality of temporary rendering images, or based on an average difference which is the average value of the plurality of differences. The normal error area may be determined based on a normalized maximum difference or a normalized average difference acquired by dividing the maximum difference or the average difference by the reflectance ρ. Alternatively, the normal error area may be determined based on the normalized maximum difference or normalized average difference acquired by dividing the maximum difference or the average difference by the input image or by the input-image-based image which is generated based on the average value or the median value of the plurality of input images.

The rendering processing using the normal information cannot reproduce shadows generated when light is blocked. Hence, a shadow area in the input image has a large difference between the input image and the temporary rendering image. Therefore, based on the difference, the first normal acquirer 104b may detect the shadow area as the normal error area even when the normal information n is accurate in the shadow area. Thus, a rendering image in which shadows are reproduced may be generated by using shape information in addition to the normal information n. When there is no shape information, the shadow area may be detected from the input image and may not use the difference in the shadow area which is detected by the difference. The shadow area in the input image may be an area in which a luminance value is less than or equal to a predetermined threshold value. Alternatively, the normal error area may be detected based on the difference between the input image and the temporary rendering image and on the sign of the difference. For example, in the shadow area in the input image, the value acquired by subtracting the temporary rendering image from the input image is negative, and thus the area with the negative difference is not to be detected as the normal error area.

The first normal acquirer 104b may acquire the normal error area by performing threshold processing on the difference. In this embodiment, the first normal acquirer 104b detects the normal error area based on the difference between the input image and the temporary rendering image, but is not limited to this. For example, the normal information n may be acquired by fitting the luminance value in the plurality of input images, and the acquired fitting error may be used as the difference when the normal error area is to be detected.

In addition, inpainting may be performed on the normal information in the normal error area in the first normal information by using normal information of the surrounding area. Various methods can be used as an inpainting method.

Figure 4:
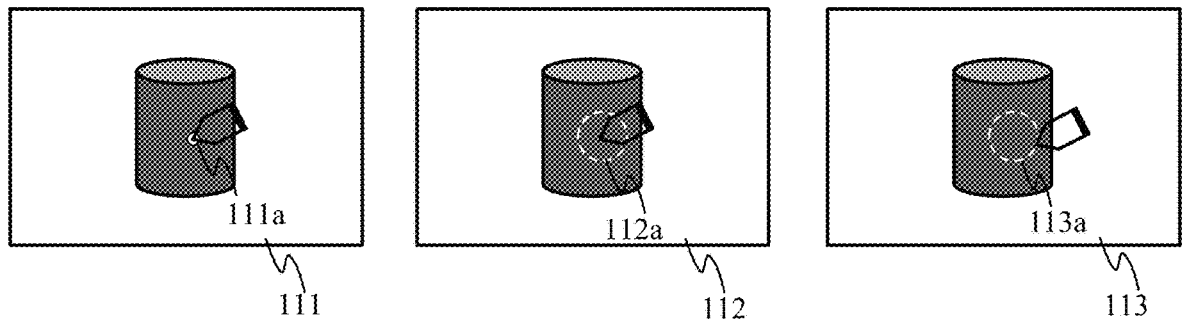
FIG. 4 is an explanatory diagram illustrating a designated area according to the first embodiment.

Subsequently, in step S103, the designated area acquirer 104c acquires a designated area (or a designated portion) which is an area in the object and is designated by the user. Here, a description will be given of the area designated by the user (designated area) with reference to FIG. 4. FIG. 4 is an explanatory diagram for the designated area. The user designates an area to be brightened or darkened while watching the image displayed on the display unit 105. As marked in an image 111 of FIG. 4, the designated area may be a pixel 111a which is designated by the user tapping or clicking the image displayed on the display unit 105. Alternatively, as marked in an image 112 of FIG. 4, the designated area may be an area 112a of a plurality of pixels including the designated pixel. Alternatively, as marked in the image 113 of FIG. 4, the designated area may be an area 113a inside a frame which is directly drawn by the user. If the designated area, which is an area designated by the user, is a normal error area (or if at least one of the first normal information and second normal information includes an error in the designated area), the user may be warned. At this time, the display unit 105 may display a warning.

Figure 5:
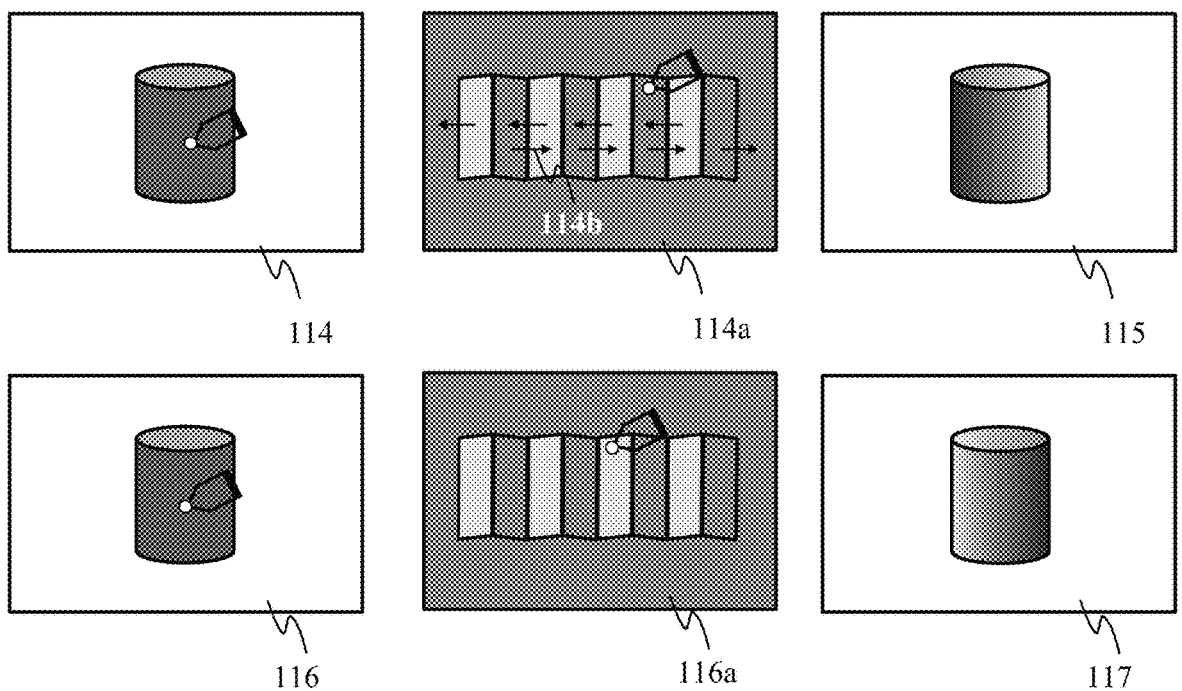
FIG. 5 is an explanatory diagram illustrating the designated area and a rendering image according to the first embodiment.

Here, if based on the first normal information of the area designated by the user, a virtual light source condition is determined so that the designated area becomes brighter or darker, and the rendering image is generated and displayed, when the designated area is shifted, lighting in the rendering image may change significantly. FIG. 5 is an explanatory diagram for the designated area and the rendering image. In particular, if a high-resolution normal acquired by the photometric stereo, etc. is used, and if there is a high-frequency structure, as illustrated in FIG. 5, the lighting in the rendering image is significantly changed by slightly shifting the area designated by the user. That is, as marked in an image 114 of FIG. 5, when a certain pixel is set as the designated area, normals 114b significantly change around the designated area as illustrated in an enlarged image 114a. In the case of the designated area illustrated in the image 114 and the enlarged image 114a, a rendering image 115 is generated, but if the designated area is slightly shifted as illustrated in an image 116 and an enlarged image 116a, the lighting significantly changes as illustrated in a rendering image 117. In order to overcome such an issue, this embodiment determines the virtual light source condition based on low frequency (or low resolution) normal information instead of using high resolution and high frequency first normal information.

Thus, in step S104, the second normal acquirer 104d acquires second normal information, which is normal information having a lower frequency than a frequency of the first normal information acquired in step S102. Here, the normal information having the lower frequency than the frequency of the first normal information is normal information having a lower resolution than the first normal information or is low-frequency normal information acquired by applying a low pass filter or the like to the first normal information. That is, in the second normal information, a normal variation amount for a position in the image is gentler than that in the first normal information.

Figure 6:
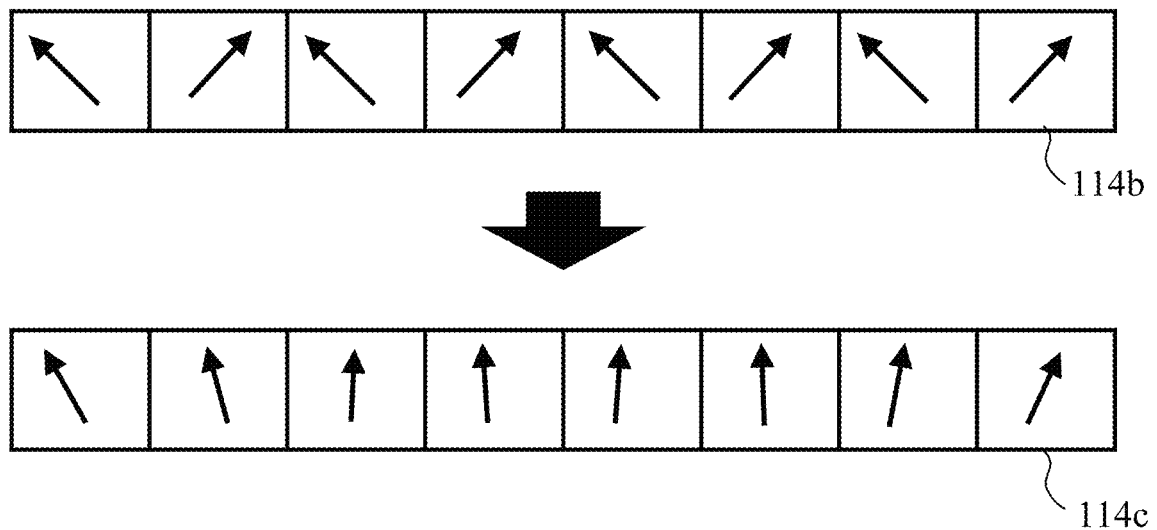
FIG. 6 is an explanatory diagram illustrating second normal information according to the first embodiment.
Figure 7:
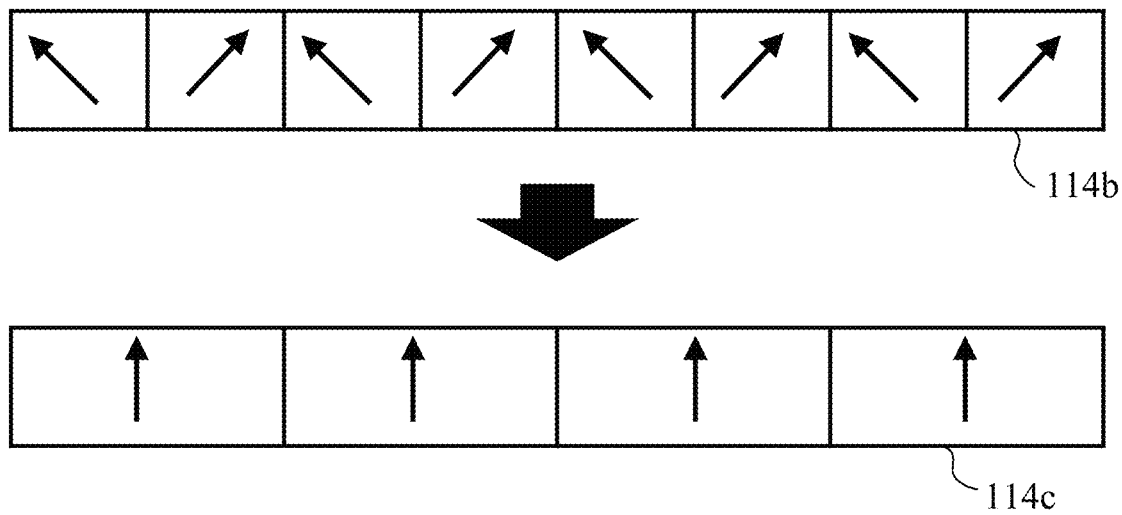
FIG. 7 is an explanatory diagram illustrating the second normal information according to the first embodiment.

Therefore, as illustrated in FIG. 6 (illustrating arrows indicating normal information of one cross section of the enlarged image 114a) which is an explanatory diagram for the second normal information, the second normal acquirer 104d acquires second normal information 114c by applying an averaging filter or a low pass filter to the first normal information 114b. Alternatively, as illustrated in FIG. 7 which is an explanatory diagram for the second normal information, the second normal acquirer 104d may acquire the second normal information 114c by reducing the first normal information 114b.

The second normal acquirer 104d may acquire the second normal information from the shape information of the object. The shape information may be acquired by using various distance measurement methods such as triangulation using a laser beam, a method of using a twin-lens stereo camera, and the like. For example, the shape information is acquired by a stereo method of acquiring a plurality of parallax images captured from different viewpoints. In the stereo method, a depth is acquired by triangulation using a parallax amount of corresponding points in the object in the acquired plurality of parallax images, position information of each viewpoint from which each parallax image is captured, and the focal length of the optical system. Distance information may be the average value of the depths calculated for the corresponding points of the object, or may be the depth at a specific point of the object.

Figure 8:
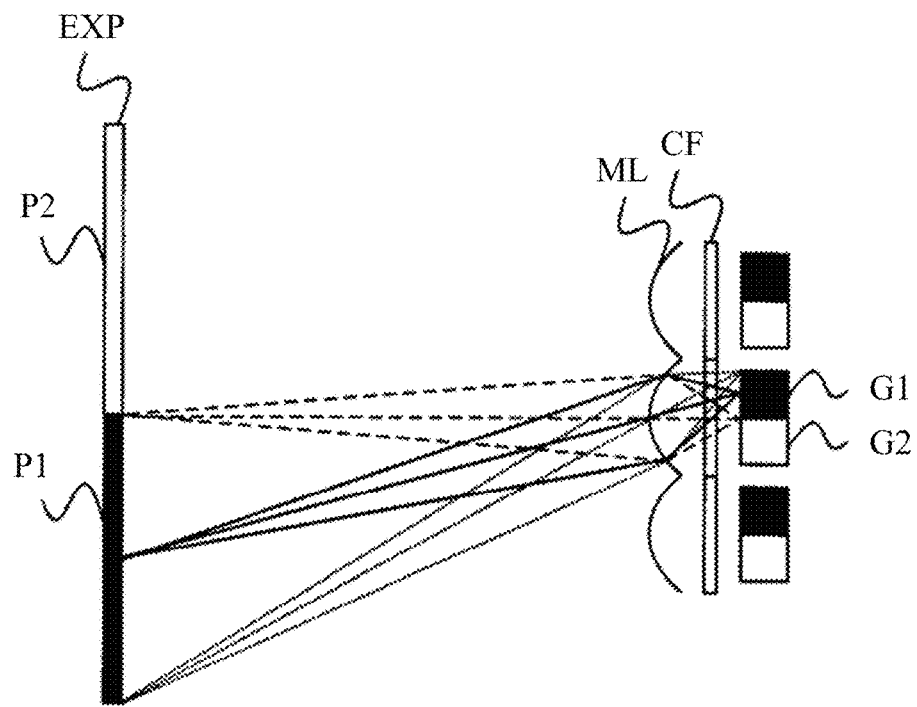
FIG. 8 is a diagram illustrating a relationship between a light receiving portion of an image sensor and a pupil of an image pickup optical system according to the first embodiment.

When the distance information is acquired from the parallax image, as illustrated in FIG. 8, in order to acquire the plurality of parallax images, the image pickup unit (image pickup system) 100 guides a plurality of light beams, which has passed through different areas P1 and P2 of a pupil of the image pickup optical system 101, to different light receiving portions (pixels) of the image sensor 102 and performs photoelectric conversion.

FIG. 8 is a diagram illustrating a relationship between the light receiving portion of the image sensor 102 and the pupil of the image pickup optical system 101. The image sensor 102 includes, as light receiving portions, a plurality of pairs of a G1 pixel and a G2 pixel, which will be also referred to as "pixel pairs". The plurality of G1 pixels are collectively referred to as a "G1 pixel group", and the plurality of G2 pixels are collectively referred to as a "G2 pixel group". The pair of the G1 pixel and the G2 pixel have a conjugate relationship with an exit pupil EXP of the image pickup optical system 101 via a common (that is, one provided for each pixel pair) microlens ML. A color filter CF is disposed between the microlens ML and the light receiving portion.

Figure 9:
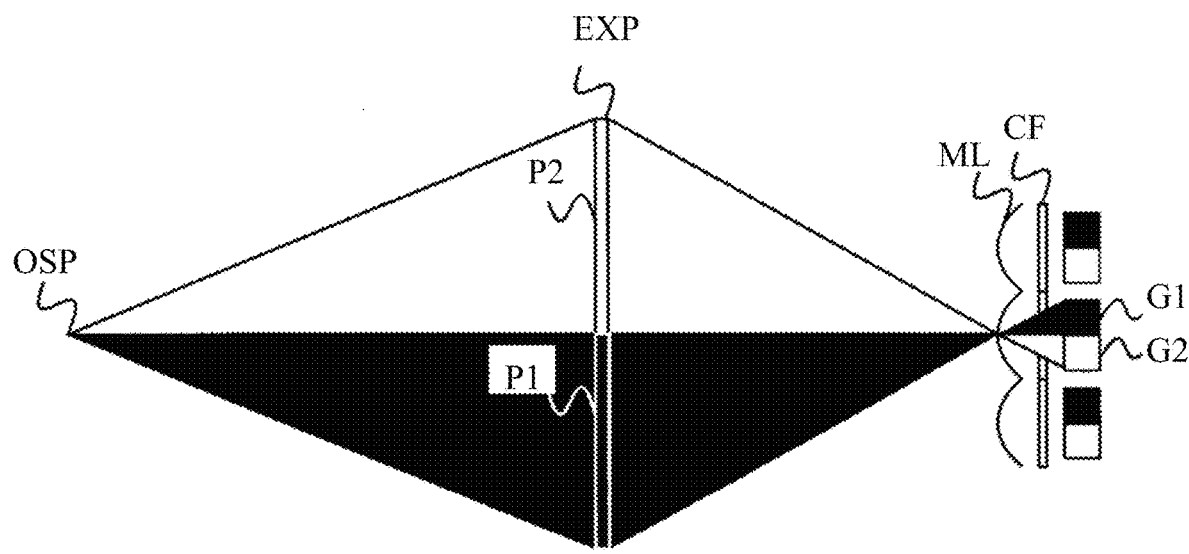
FIG. 9 is a schematic diagram illustrating an image pickup unit according to the first embodiment.

FIG. 9 is a schematic view illustrating the image pickup unit (image pickup system) where it is assumed that a thin lens is disposed on the position of the exit pupil EXP. The G1 pixel receives a light beam that has passed through the area P1 of the exit pupil EXP, and the G2 pixel receives a light beam that has passed through the area P2 of the exit pupil EXP. The object does not necessarily exist in an object point OSP being imaged, and a light beam that has passed through the object point OSP enters the G1 pixel or the G2 pixel depending on a passing area (position) in the pupil. The light beam passing through different areas in the pupil corresponds to an incident light from the object point OSP being split depending on an angle (or parallax). That is, the plurality (here, a pair) of parallax images having parallax with each other are an image generated by using an output signal from the G1 pixel and an image generated by using an output signal from the G2 pixel, the G1 pixel and the G2 pixel being disposed for each microlens ML. In the following description, a "pupil division" denotes receiving light beam that has passed through different areas in the pupil by different light receiving portions (pixels).

In FIGS. 8 and 9, even when due to the position of the exit pupil EXP being displaced or the like, the above-described conjugate relationship is not perfect or the area P1 and the area P2 partially overlap, the acquired plurality of images can be treated as the parallax images.

Figure 10:
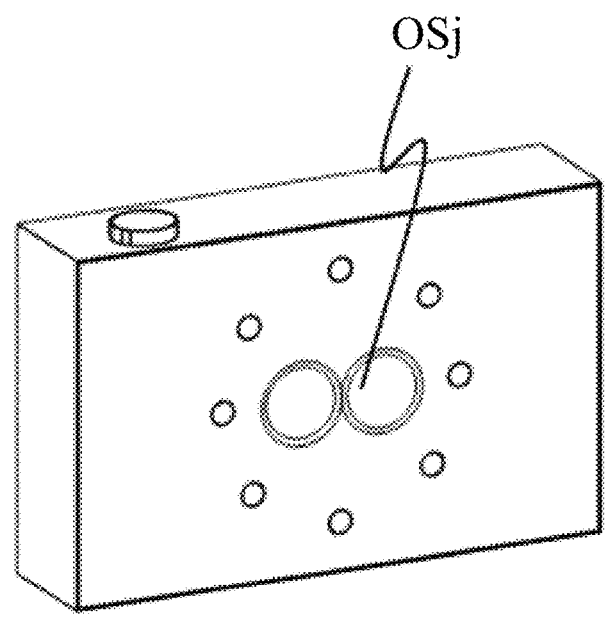
FIG. 10 is a diagram illustrating another example of the image pickup apparatus according to the first embodiment.

FIG. 10 is a diagram illustrating another example of the image pickup apparatus. As illustrated in FIG. 10, a parallax image may be acquired when a plurality of image pickup optical systems OSj (j=1, 2) is included in one image pickup apparatus. A parallax image may also be acquired when images of the same object is captured by using a plurality of cameras.

In this embodiment, the acquisition of the second normal information in step S104 may be performed before the acquisition of the designated area in step S103.

Subsequently, in step S105, the virtual light source determiner 104e determines the virtual light source condition based on the second normal information corresponding to the area designated by the user. Specifically, the virtual light source determiner 104e determines the light source vector of the virtual light source using the normal information of the designated area in the second normal information. When the area designated by the user is to be brightened, the normal vector of the designated area in the second normal information may be used as the light source vector of the virtual light source. On the other hand, when the area designated by the user is to be darkened, for example, a vector acquired by multiplying the x and y components of the normal vector of the designated area in the second normal information by −1 may be used as the light source vector of the virtual light source. Alternatively, the normal vector of the designated area may be used as the light source vector of the virtual light source so that the designated area is brightened, and the designated area may be darkened by subtracting a rendering image generated by using the virtual light source in step S106 described later from the base image.

If the designated area in the second normal information includes a plurality of normal vectors, the average value or the median value of the plurality of normal vectors may be used. The light source vector of the virtual light source may be determined using the second normal information of the surrounding area as well as the designated area. For example, the virtual light source determiner 104e determines the light source vector of the virtual light source using the average value or the median value of the plurality of normal vectors of the designated area and its surrounding area. The size of the surrounding area may be a predetermined size, or may be acquired by allowing the user to set it. The size of the surrounding area may be determined depending on a display magnification of the image when the user designates the designated area. For example, when the display magnification is large, the size of the surrounding area is reduced.

When the designated area in the second normal information includes the plurality of normal vectors of a plurality of classifications, the virtual light source determiner 104e may determine a plurality of virtual light sources. For example, if a representative plurality of normal vectors can be extracted from a histogram of the plurality of normal vectors, the plurality of light source vectors of the virtual light source may be determined.

If the designated area is a normal error area, that is, if an error is included in the second normal information corresponding to the designated area, the virtual light source may be determined using the second normal information of the area that is not the normal error area. For example, the virtual light source determiner 104e determines the virtual light source using the second normal information of the surrounding area of the designated area, the surrounding area not being the normal error area. Alternatively, the virtual light source determiner 104e may determine the virtual light source condition using the second normal information in an area in the designated area, the area not being the normal error area.

Subsequently, in step S106, the rendering unit 104f generates a rendering image based on the virtual light source condition acquired in step S105, and displays it on the display unit 105. The rendering image is an image in which the virtual light source is set so that the area designated by the user becomes brighter or darker, the designated area being acquired in step S103. The rendering image may be only a rendering image generated based on the virtual light source condition, or may be an image acquired by performing an addition or weighted average on a base image such as an input image. The base image may be the input images acquired by changing the light source position, or may be an image captured in a different light source environment such as an ambient light image captured while the light source does not emit light. The base image may be the image displayed by the display unit 105 described in step S101. In the generation of the rendering image, it is not necessary to use the reflection characteristic assumed in the normal information calculation in step S102, and the rendering image may be generated by another diffusion reflection characteristic or, in addition, mirror surface reflection characteristic. The input image or the base image may be regarded as the reflectance in generating the rendering image.

If the designated area is a normal error area, a base image in which the brightness is changed around the designated area may be generated as a rendering image while the normal information is not used. For example, the rendering unit 104f generates, as a rendering image, a base image in which the brightness is radially changed around the designated area.

If the user redesignates an area in a different object, the process returns to the acquisition of the designated area in step S103, the virtual light source is determined, and the rendering image is generated and displayed. At that time, if the second normal information has already been acquired, it is not necessary to acquire the second normal information again.

Figure 11:
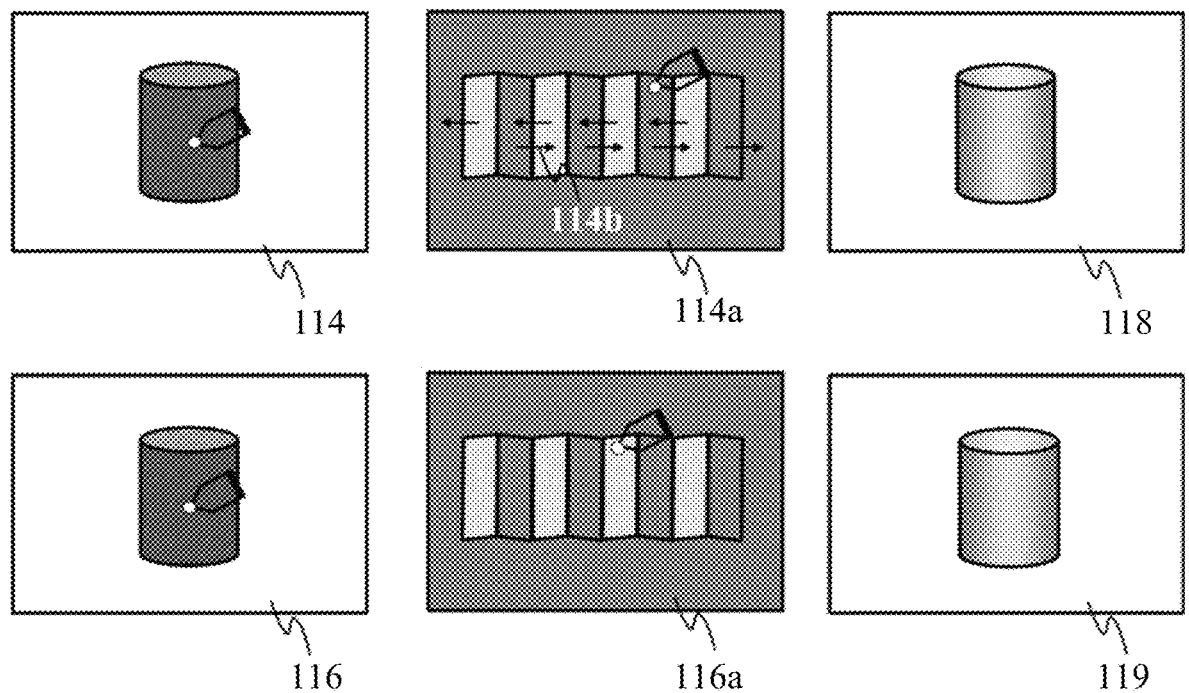
FIG. 11 is an explanatory diagram illustrating the designated area and the rendering image according to the first embodiment.

As described above, in this embodiment, the virtual light source condition is determined based on the low frequency second normal information. Thereby, as illustrated in FIG. 11 which is an explanatory diagram for the designated area and the rendering image, it is possible to generate and display rendering images 118 and 119 between which the lighting smoothly changes even if the user shifts the designated area.

Figure 2B:
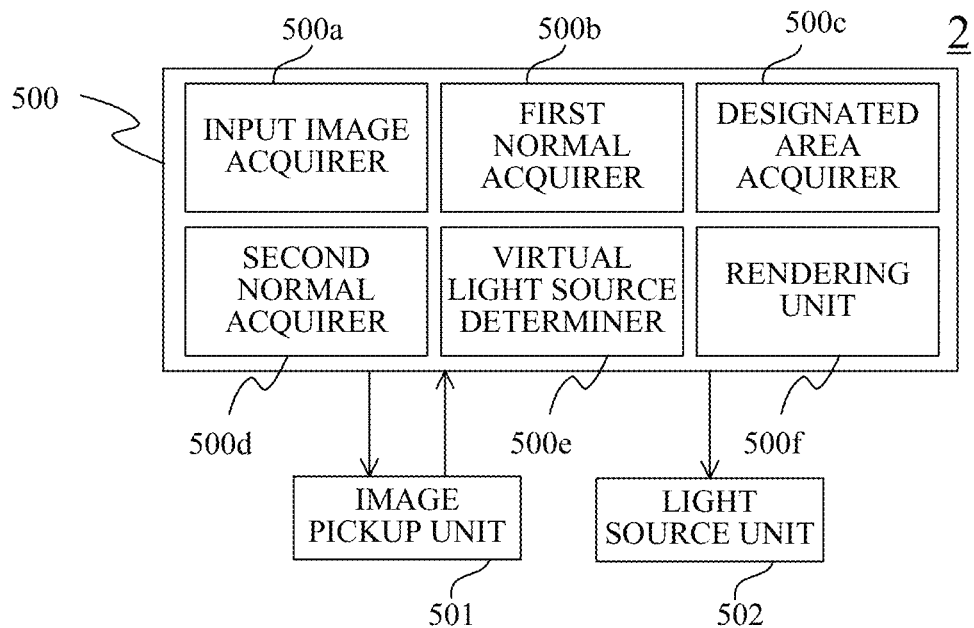
FIG. 2B is a block diagram illustrating a processing system according to the first embodiment and the second embodiment.

In this embodiment, the surface normal of the object is calculated in the image pickup apparatus to generate the rendering image, but processing may be performed using a processing system 2 illustrated in FIG. 2B which is different from the image pickup apparatus. The processing system 2 illustrated in FIG. 2B includes a processing apparatus 500, an image pickup unit 501, and a light source unit 502. The processing apparatus 500 includes an input image acquirer 500a, a first normal acquirer 500b, a designated area acquirer 500c, a second normal acquirer 500d, a virtual light source determiner 500e, and a rendering unit 500f. When a rendering image is generated using the processing system 2, first, the input image acquirer 500a acquires a plurality of input images acquired by capturing an image of an object while a different light source position was used for each image. Subsequently, the first normal acquirer 500b calculates first normal information and a reflectance of the object based on the plurality of input images. Subsequently, the designated area acquirer 500c acquires a designated area, which is an area in the object and is designated by the user. Subsequently, the second normal acquirer 500d acquires second normal information, which is normal information having a lower frequency than a frequency of the first normal information. Subsequently, the virtual light source determiner 500e determines a virtual light source condition based on the second normal information corresponding to the area designated by the user. Thereafter, the rendering unit 500f generates a rendering image based on the virtual light source condition. The image pickup unit 501 and the light source unit 502 may be individual apparatuses, or the light source unit 502 may be built in the image pickup unit 501.

This embodiment can let the user intuitively change the lighting in the image, by determining the virtual light source based on the second normal information corresponding to the designated area.

Second Embodiment

Next, a description will be given of the second embodiment of the present disclosure. This embodiment can let a user intuitively change lighting in an image, by acquiring a normal of an object and determining a virtual light source condition based on second normal information corresponding to an area designated by the user (designated area), while using the same image pickup apparatus as the first embodiment. In this embodiment, normal information of the designated area and its surrounding area in the first normal information is used to acquire the second normal information corresponding to the designated area, and the second normal information is used to determine the virtual light source condition.

As in the first embodiment, FIG. 2A is a block diagram illustrating the image pickup apparatus 1 in this embodiment, and FIG. 3 is a flowchart illustrating rendering processing (processing method) in this embodiment. The rendering processing in this embodiment is executed by the system controller 110 and the image pickup controller 107 according to an image processing program as a computer program, as in the first embodiment.

The image processor 104 is configured to perform image processing generally performed for the digital signal, to acquire normal information of the object, and to generate a rendering image reproducing an appearance under an arbitrary virtual light source. The image processor 104 includes an input image acquirer 104a, a first normal acquirer 104b, a designated area acquirer 104c, a second normal acquirer 104d, a virtual light source determiner 104e, and a rendering unit 104f. Steps S101 to S103 and S106 in FIG. 3 are the same as those in the first embodiment, respectively, and thus a detailed description thereof will be omitted.

Figure 12:
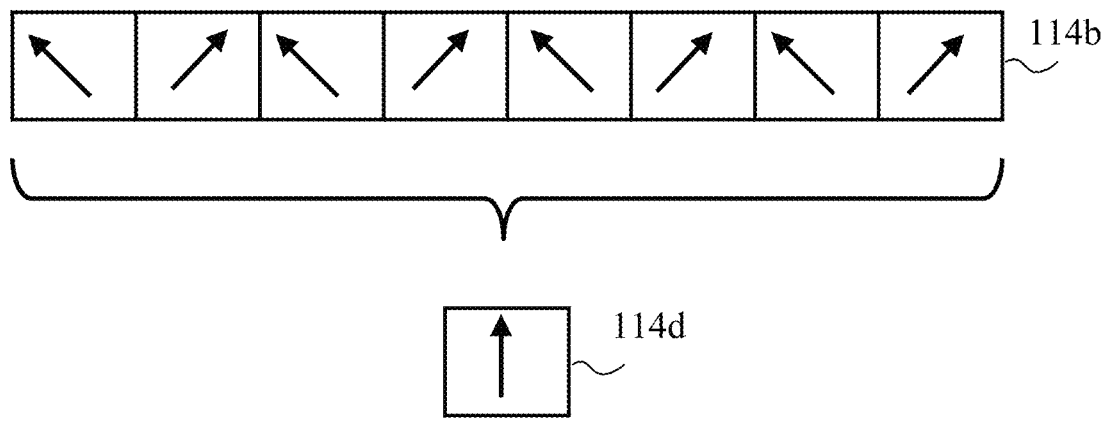
FIG. 12 is an explanatory diagram illustrating second normal information according to the second embodiment.

In step S104, the second normal acquirer 104d acquires second normal information, which is normal information having a lower frequency than a frequency of the first normal information acquired in step S102, based on the designated area acquired in step S103. When the designated area is an area of one pixel, the second normal information is acquired based on the first normal information of the designated area and its surrounding area. Specifically, as illustrated in FIG. 12 (illustrating arrows indicating normal information in one cross section of the enlarged image 114a in FIG. 5), the normal vector 114d of the second normal information is determined by using the average value or the median value of a plurality of normal vectors 114b of the designated area and the its surrounding area in the first normal information. If the designated area in the first normal information includes the plurality of normal vectors, the average value or the median value of the plurality of normal vectors may be used. The second normal information may be acquired by using the first normal information of not only the designated area but also the surrounding area. For example, the second normal acquirer 104d acquires the normal vector of the second normal information by using the average value or the median value of the plurality of normal vectors of the designated area and the surrounding area. The size of the surrounding area may be a predetermined size, or may be acquired by allowing the user to set it. The size of the surrounding area may be determined depending on a display magnification of the image when the user designates the designated area. For example, when the display magnification is large, the size of the surrounding area is reduced.

When the designated area in the first normal information includes a plurality of normal vectors of a plurality of classifications, a plurality of pieces of second information may be acquired. For example, if a representative plurality of normal vectors can be extracted from a histogram of the plurality of normal vectors of the designated area in the first normal information, the second normal acquirer 104d may acquire the plurality of normal vectors as the second normal information.

If the designated area is a normal error area, that is, if an error is included in the first normal information, the second normal information may be acquired by using normal information of an area which is not a normal error area. For example, the second normal acquirer 104d acquires the second information using the first normal information of the surrounding area of the designated area, the surrounding area not being the normal error area. Alternatively, the second normal acquirer 104d may acquire the second information using the first normal information in an area in the designated area, the area not being the normal error area.

In step S105, the virtual light source determiner 104e determines the virtual light source condition based on the second normal information corresponding to the area designated by the user acquired in step S104. Specifically, the virtual light source determiner 104e determines the light source vector of the virtual light source using the second normal information corresponding to the designated area.

In brightening the area designated by the user, the normal vector in the second normal information corresponding to the designated area may be used as the light source vector of the virtual light source. On the other hand, in darkening the area designated by the user, for example, a vector acquired by multiplying the x and y components of the normal vector in the second normal information corresponding to the designated area by −1 may be used as the light source vector of the virtual light source. Alternatively, the normal vector in the second normal information corresponding to the designated area may be used as the light source vector of the virtual light source so that the designated area is brightened, and the designated area may be darkened by subtracting a rendering image generated by using the virtual light source in step S106 described later from the base image. When the second normal information corresponding to the designated area acquired in step S104 includes the plurality of normal vectors, the virtual light source determiner 104e may determine a plurality of virtual light sources.

Subsequently, in step S106, the rendering unit 104f generates a rendering image based on the virtual light source condition acquired in step S105, and displays it on the display unit 105.

This embodiment can let the user intuitively change the lighting in the image, by using the normal information of the designated area and its surrounding area in the first normal information to acquire the second normal information corresponding to the designated area, and by using the second information to determine the virtual light source.

Third Embodiment

Figure 13:
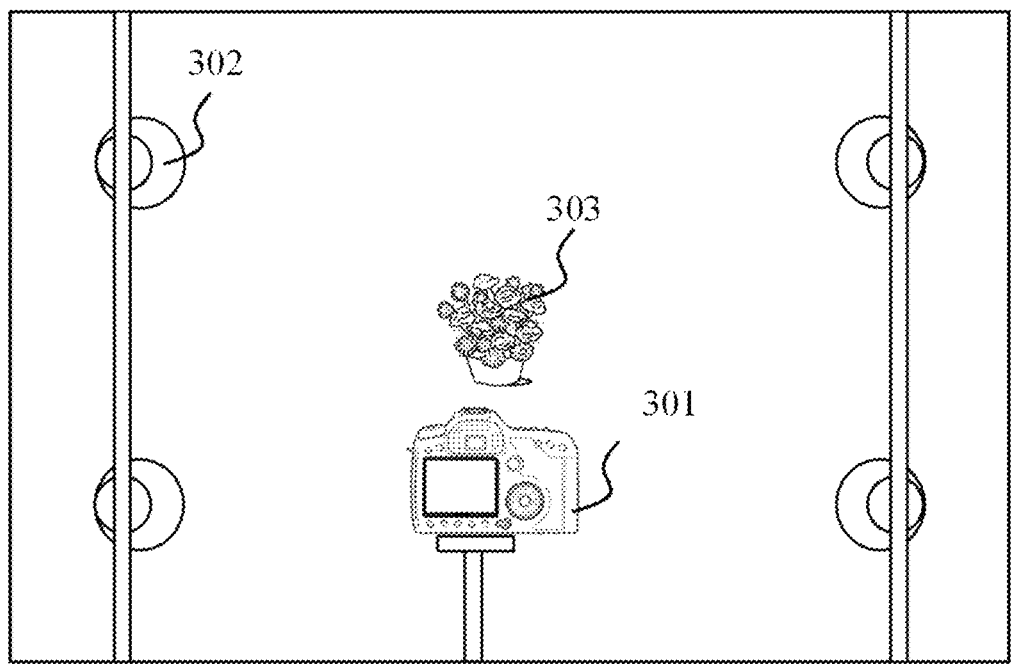
FIG. 13 is an external view illustrating a processing system according to a third embodiment.

Next, the third embodiment of the present disclosure will be described with reference to FIG. 13. The first and second embodiments described the image pickup apparatus with a built-in light source, but in this embodiment, a description will be given of a processing system including an image pickup apparatus and a light source unit. FIG. 13 is an external view illustrating a processing system 3. The processing system 3 includes an image pickup apparatus 301 configured to capture an image of an object 303 and a plurality of light source units 302. The image pickup apparatus 301 of this embodiment has the same configuration as the configuration of the image pickup apparatus 1 of the first embodiment, but it is not necessary to include the plurality of light sources for the photometric stereo as the light source unit.

The light source units 302 may be connected to the image pickup apparatus 301 via wire or wirelessly and may be controlled based on information from the image pickup apparatus 301. The photometric stereo requires images captured with at least three light sources sequentially emit light, but if a light source unit having a movable light source is used, at least one light source unit may be used. However, in that case, the light source is moved and the images are captured with at least three different light source positions. Since the rendering processing in this embodiment is the same as those in the first embodiment and the second embodiment, detailed description thereof will be omitted.

This embodiment can let the user intuitively change the lighting in the image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide a processing apparatus, a processing system, an image pickup apparatus, a processing method, and a memory medium each of which can let a user intuitively change lighting in an image, While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-100331, filed on Jun. 9, 2020 which is hereby incorporated by reference herein in its entirety.

What is claimed is:

1. An apparatus comprising:
at least one processor configured to execute a plurality of tasks including:
a first normal acquiring task configured to acquire first normal information of an object;
a designated area acquiring task configured to acquire a designated portion in the object, the designated area being designated by a user;
a second normal acquiring task configured to acquire second normal information of the object based on the first normal information, the second normal information being normal information having a lower frequency than a frequency of the first normal information;
a virtual light source determining task configured to determine a virtual light source condition based on the second normal information corresponding to the designated portion; and
a rendering task configured to generate a rendering image using the first normal information and the virtual light source condition.

2. The apparatus according to claim 1, wherein the second normal acquiring task acquires shape information of the object, and acquires the second normal information from the shape information.

3. The apparatus according to claim 1, wherein the virtual light source determining task determines the virtual light source condition based on the second normal information of the designated portion and of its surrounding portion.

4. The apparatus according to claim 1,
wherein the designated portion is a plurality of pixels, and
wherein the virtual light source determining task determines the virtual light source condition based on a plurality of pieces of normal information of the designated portion, the plurality of pieces of normal information being included in the second normal information.

5. The apparatus according to claim 1,
wherein the second normal acquiring task acquires the second normal information based on the first normal information and the designated portion.

6. The apparatus according to claim 5,
wherein the second normal acquiring task acquires the second normal information based on the first normal information of the designated portion and of its surrounding portion.

7. The apparatus according to claim 5,
wherein the designated portion is a plurality of pixels, and
wherein the second normal acquiring task acquires the second normal information based on a plurality of pieces of normal information of the designated portion, the plurality of pieces of normal information being included in the first normal information.

8. The apparatus according to claim 1,
wherein the at least one processor is further configured to execute an input image acquiring task configured to acquire, as input images, a plurality of captured images captured with at least three different light source positions, and
wherein the first normal acquiring task acquires the first normal information of the object using the input images.

9. The apparatus according to claim 1,
wherein the virtual light source determining task determines the virtual light source condition so that the designated portion of the object is brightened.

10. The apparatus according to claim 1,
wherein the virtual light source determining task determines the virtual light source condition so that the designated portion of the object is darkened.

11. The apparatus according to claim 8,
wherein the virtual light source determining task determine the virtual light source condition so that the designated portion of the object is brightened, and
wherein the rendering task acquires, as a base image, a plurality of captured images captured with at least three different light source positions or an ambient light image acquired by capturing an image without light emitted from a light source, and generates the rendering image so that the designated portion of the object is darkened by subtracting an image rendered based on the virtual light source condition from the base image.

12. The apparatus according to claim 5,
wherein when the designated portion is a normal error area, the second normal acquiring task acquires the second normal information based on the first normal information of a surrounding area of the designated portion, the surrounding area not being a normal error area.

13. The apparatus according to claim 1,
wherein when the designated portion is a normal error area, the virtual light source determining task acquires the virtual light source condition based on the second normal information of a surrounding area of the designated portion, the surrounding area not being a normal error area.

14. The apparatus according to claim 2,
wherein when the designated portion is a normal error area, the second normal acquiring task acquires, as the second normal information, normal information acquired by calculation using the shape information of the object.

15. The apparatus according to claim 1,
wherein the first normal acquiring task acquires a normal error area based on a plurality of images acquired with different light source positions and a temporary rendering image in which an appearance under a same light source condition as at least one light source condition of the plurality of images is reproduced.

16. A system comprising:
a light source unit; and
a processing apparatus,
wherein the processing apparatus includes at least one processor configured to execute a plurality of tasks of:
a first normal acquiring task configured to acquire first normal information of an object;
a designated area acquiring task configured to acquire a designated portion in the object, the designated area being designated by a user;
a second normal acquiring task configured to acquire second normal information of the object based on the first normal information, the second normal information being normal information having a lower frequency than a frequency of the first normal information;
a virtual light source determining task configured to determine a virtual light source condition based on the second normal information corresponding to the designated portion; and
a rendering task configured to generate a rendering image using the first normal information and the virtual light source condition.

17. A pickup apparatus comprising:
a pickup unit configured to capture an image of an object; and
the apparatus according to claim 1.

18. A method comprising:
acquiring first normal information of an object;
acquiring a designated portion in the object, the designated area being designated by a user;
acquiring second normal information of the object based on the first normal information, the second normal information being normal information having a lower frequency than a frequency of the first normal information;
determining a virtual light source condition based on the second normal information corresponding to the designated portion; and
generating a rendering image using the first normal information and the virtual light source condition.

19. A non-transitory computer-readable memory medium storing a computer program that causes a computer to execute a method, the method comprising:
acquiring first normal information of an object;
acquiring a designated portion in the object based on the first normal information, the designated area being designated by a user;
acquiring second normal information of the object, the second normal information being normal information having a lower frequency than a frequency of the first normal information;

determining a virtual light source condition based on the second normal information corresponding to the designated portion; and generating a rendering image using the first normal information and the virtual light source condition.

* * * * *